United States Patent
Shi

(10) Patent No.: US 10,434,599 B2
(45) Date of Patent: Oct. 8, 2019

(54) OPTICAL MASK PLATE AND LASER LIFT-OFF DEVICE

(71) Applicant: BOE TECHNOLOGY GROUP CO., LTD., Beijing (CN)

(72) Inventor: Shiming Shi, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 292 days.

(21) Appl. No.: 14/436,907

(22) PCT Filed: Sep. 29, 2014

(86) PCT No.: PCT/CN2014/087764
§ 371 (c)(1),
(2) Date: Apr. 20, 2015

(87) PCT Pub. No.: WO2015/135316
PCT Pub. Date: Sep. 17, 2015

(65) Prior Publication Data
US 2016/0023305 A1   Jan. 28, 2016

(30) Foreign Application Priority Data

Mar. 12, 2014   (CN) .......................... 2014 1 0090160

(51) Int. Cl.
*B23K 26/06* (2014.01)
*G02B 5/00* (2006.01)
*G02F 1/1333* (2006.01)

(52) U.S. Cl.
CPC .......... *B23K 26/0661* (2013.01); *G02B 5/005* (2013.01); *G02F 1/1333* (2013.01)

(58) Field of Classification Search
CPC .... B23K 26/0661; G02B 5/005; G02F 1/1333
(Continued)

(56) References Cited

U.S. PATENT DOCUMENTS 5,502,001 A * 3/1996 Okamoto ........... G01B 11/0608
219/121.69
5,779,924 A * 7/1998 Krames .................. H01L 33/20
216/24

(Continued)

FOREIGN PATENT DOCUMENTS

CN    1228607 A   9/1999
CN    1442884 A   9/2003
(Continued)

OTHER PUBLICATIONS

International Search Report dated Sep. 29, 2014 corresponding to International application No. PCT/CN2014/087764.
(Continued)

*Primary Examiner* — Tu B Hoang
*Assistant Examiner* — Vy T Nguyen
(74) *Attorney, Agent, or Firm* — Nath, Goldberg & Meyer; Joshua B. Goldberg

(57) ABSTRACT

The present invention provides an optical mask plate and a laser lift-off device. The optical mask plate comprises at least one totally-transmissive region and a blocking region surrounding the totally-transmissive region. The totally-transmissive region allows lasers having a predetermined wavelength to completely pass therethrough, while the blocking region does not allow the lasers having the predetermined wavelength to pass therethrough. The laser lift-off device comprises the optical mask plate. During the whole process of scanning a rigid substrate with the laser beam, as a laser emitter for emitting the laser beam can be in an on state all the time, the energy of the laser beam is nearly uniform in the process of scanning the rigid substrate with the laser beam, and in this way, edge portions of a flexible device can be prevented from being burned by the laser beam.

18 Claims, 2 Drawing Sheets

(58) Field of Classification Search
USPC ...... 219/121.6; 359/893, 894; 362/235, 249;
257/88; 156/712, 753; 430/321, 322,
430/329
See application file for complete search history.

(56) References Cited

U.S. PATENT DOCUMENTS

| | | | | |
|---|---|---|---|---|
| 5,853,960 | A * | 12/1998 | Tran | G02B 3/0012 430/321 |
| 6,656,373 | B1 * | 12/2003 | Neal | G01J 9/00 216/12 |
| 6,919,162 | B1 * | 7/2005 | Brennen | G01N 30/6095 430/272.1 |
| 7,098,589 | B2 * | 8/2006 | Erchak | H01L 33/20 257/466 |
| 7,345,298 | B2 * | 3/2008 | Weisbuch | H01S 5/12 257/13 |
| 7,357,963 | B2 * | 4/2008 | Jung | H01L 21/2026 427/554 |
| 7,368,204 | B2 * | 5/2008 | You | G03F 9/7076 430/5 |
| 7,482,552 | B2 * | 1/2009 | Jung | H01L 21/2026 219/121.66 |
| 7,579,123 | B2 * | 8/2009 | Chu | C30B 13/24 430/5 |
| 7,691,545 | B2 * | 4/2010 | Lee | H01L 21/2026 430/5 |
| 8,778,600 | B2 * | 7/2014 | Suh | H01L 51/0016 430/322 |
| 9,574,967 | B2 * | 2/2017 | Maeda | G01M 11/0207 |
| 2003/0057444 | A1 * | 3/2003 | Niki | H01L 33/007 257/200 |
| 2003/0088848 | A1 * | 5/2003 | Crowder | H01L 21/2026 438/487 |
| 2003/0170963 | A1 * | 9/2003 | Voutsas | H01L 27/1285 438/401 |
| 2004/0253819 | A1 * | 12/2004 | You | C30B 13/24 438/689 |
| 2006/0175624 | A1 * | 8/2006 | Sharma | B82Y 20/00 257/94 |
| 2006/0192217 | A1 * | 8/2006 | David | H01L 33/20 257/94 |
| 2007/0015066 | A1 * | 1/2007 | Sun | H01L 21/02532 430/5 |
| 2008/0176398 | A1 * | 7/2008 | Jain | H01L 21/0272 438/674 |
| 2010/0214640 | A1 * | 8/2010 | Ando | G02B 27/0988 359/238 |
| 2011/0151602 | A1 * | 6/2011 | Speier | H01L 33/0079 438/26 |
| 2011/0183449 | A1 * | 7/2011 | Ryu | H01L 21/268 438/22 |
| 2011/0227086 | A1 * | 9/2011 | French | H01L 27/1266 257/59 |
| 2012/0064735 | A1 * | 3/2012 | Zhang | B23K 26/0648 438/795 |
| 2012/0320581 | A1 * | 12/2012 | Rogers | H01L 24/24 362/235 |
| 2013/0126081 | A1 * | 5/2013 | Hu | H01L 24/75 156/249 |
| 2013/0278922 | A1 * | 10/2013 | Gelernt | G02B 21/16 356/51 |
| 2014/0102643 | A1 * | 4/2014 | Porneala | B32B 43/006 156/712 |
| 2015/0380478 | A1 * | 12/2015 | Levy | H01L 28/87 257/532 |
| 2016/0126381 | A1 * | 5/2016 | Wang | H01L 31/035227 257/429 |

FOREIGN PATENT DOCUMENTS

| | | |
|---|---|---|
| CN | 1670622 A | 9/2005 |
| CN | 1924683 A | 3/2007 |
| CN | 101202218 A | 6/2008 |
| CN | 101211119 A | 7/2008 |
| CN | 101599418 A | 12/2009 |
| CN | 102339738 A | 2/2012 |
| CN | 102692816 A | 9/2012 |
| CN | 103474583 A | 12/2013 |
| CN | 103887157 A | 6/2014 |
| JP | 2007149988 A | 6/2007 |

OTHER PUBLICATIONS

Written Opinion of the International Searching Authority dated Dec. 31, 2014 corresponding to International application No. PCT/CN2014/087764.
The First Office Action dated Jan. 19, 2016 corresponding to Chinese application No. 201410090160.X.

* cited by examiner

OPTICAL MASK PLATE AND LASER LIFT-OFF DEVICE

This is a National Phase Application filed under 35 U.S.C. 371 as a national stage of PCT/CN2014/087764, filed Sep. 29, 2014, and claims priority benefit from Chinese Application No. 201410090160.X, filed Mar. 12, 2014, the content of each of which is hereby incorporated by reference in its entirety.

FIELD OF THE INVENTION

The present invention relates to production equipment for flexible electronic components, in particular to an optical mask plate and a laser lift-off device including the optical mask plate.

BACKGROUND OF THE INVENTION

Flexible display panel, due to its characteristics of light weight, bendability, impact resistance and shatter resistance, becomes one of the development trends of future display technology. At present, glass substrates are generally used as carriers in manufacturing flexible display panels. First, a plastic substrate is formed on a glass substrate. Specifically, plastic raw material such as polyimide may be coated on the glass substrate and then dried and solidified to form the plastic substrate, or a flexible plastic film (for example, a polyimide film, a PEN or PET film, etc.) is pasted on the glass substrate to form the plastic substrate. Then, electronic devices (for example, thin film transistors, circuits, OLEDs, etc.) are formed on the plastic substrate through the same process as that in manufacturing rigid display panels. Finally, the plastic substrate with the electronic devices formed thereon is separated from the glass substrate.

Specifically, the plastic substrate may be separated from the glass substrate by using a laser lift-off method. The principle of the laser lift-off method is as follows: the glass substrate is irradiated with a laser beam, so that certain heat may be generated between the glass substrate and the plastic substrate, so that the bonding force at an interface of the plastic substrate and the glass substrate is reduced, thus realizing separation; then, the plastic substrate and display devices are taken off by simple cutting and mechanical lift-off methods.

As the size of the glass substrate is large, usually, a plurality of flexible display panels may be fabricated on one glass substrate. Therefore, when lifting off the plastic substrate on the glass substrate, it is desirable to separate regions with the flexible display panels, but regions without the flexible display panels (including a region between two adjacent flexible display panels and a region between an edge of the glass substrate and an edge of the outermost flexible display panel) may not be treated. In the process of laser scanning by a laser lift-off method, a laser emitter is turned off when reaching the region without the flexible display panel, while the laser emitter is turned on when reaching the region with the flexible display panel. However, as it is difficult to control the energy of lasers emitted by the laser emitter to be desired energy at the moment when the laser emitter is turned on (usually, the energy of lasers at that moment is far higher than the desired energy), the heat at the interface of the plastic substrate and the glass substrate, on the edges of the flexible display panels, increases sharply. As a result, the plastic substrate is likely to be burned, blackened, deformed or even damaged, which further causes edge portions of the flexible devices to be damaged.

Therefore, how to prevent damage to a plastic substrate of a flexible display panel during laser lift-off and thus to avoid damage to edge portions of a flexible device becomes a technical problem to be urgently solved in the art.

SUMMARY OF THE INVENTION

An object of the present invention is to provide an optical mask plate and a laser lift-off device including the optical mask plate. When a flexible device adhered onto a rigid substrate is lifted off by the laser lift-off device, edges of the flexible device can be prevented from being damaged.

To achieve the above object, one aspect of the present invention provides an optical mask plate, including at least one totally-transmissive region and a blocking region surrounding the totally-transmissive region, wherein the totally-transmissive region allows lasers having a predetermined wavelength to completely pass therethrough, while the blocking region does not allow the lasers having the predetermined wavelength to pass therethrough.

Preferably, the optical mask plate includes a plurality of totally-transmissive regions, and each totally-transmissive region is surrounded by the blocking region.

Preferably, the blocking region is made of metal material, and each totally-transmissive region is a first through hole.

Preferably, the blocking region is made of metal material, and each totally-transmissive region is made of light transmitting material.

Preferably, each totally-transmissive region is made of quartz material or glass.

Preferably, the optical mask plate further includes at least one transition region, each of which is located between the totally-transmissive region and the blocking region, and the transition region surrounds the totally-transmissive region and allows a part of the lasers having the predetermined wavelength to pass therethrough.

Preferably, a width of the transition region is one twentieth to one tenth of a width of the totally-transmissive region.

Preferably, each transition region is made of metal material, and a plurality of second through holes having a diameter of micrometer scale are formed in each transition region.

Preferably, within each transition region, the number of the second through holes in a unit area decreases gradually in a direction from an edge adjacent to the totally-transmissive region to an edge adjacent to the blocking region.

Preferably, each transition region is made of material having a predetermined transmittance so that the transition region allows a part of the lasers having the predetermined wavelength to pass therethrough.

Preferably, each transition region includes a transparent material layer and a blocking layer disposed on the transparent material layer, a plurality of third through holes having a diameter of micrometer scale are formed in the blocking layer, the transparent material layer allows the lasers having the predetermined wavelength to pass therethrough, and portions of the blocking layer without any third through hole formed therein do not allow the lasers having the predetermined wavelength to pass therethrough.

Preferably, within each transition region, the number of the third through holes in a unit area decreases gradually in a direction from an edge adjacent to the totally-transmissive region to an edge adjacent to the blocking region.

Another aspect of the present invention provides a laser lift-off device, including an optical mask plate and a laser emitter capable of emitting a laser beam composed of lasers having a predetermined wavelength, wherein the optical mask plate is the above optical mask plate provided by the present invention, and the laser emitter is able to emit the laser beam towards the optical mask plate from one side of the optical mask plate.

During the whole process of scanning a rigid substrate with a laser beam, as the laser emitter for emitting the laser beam can be in an on state all the time, the energy of the laser beam is nearly uniform in the process of scanning the rigid substrate with the laser beam, and accordingly, edge portions of a flexible device can be prevented from being burned by the laser beam.

BRIEF DESCRIPTION OF THE DRAWINGS

The accompanying drawings are used for providing a further understanding of the present invention and constitute a part of the description. The accompanying drawings, together with the following specific implementations, are used for explaining the present invention and not intended to limit the present invention. In the drawings:

FIG. 4($b$) and FIG. 4($c$) are diagrams illustrating use states of a laser lift-off device provided by the present invention.

DETAILED DESCRIPTION OF THE EMBODIMENTS

The specific implementations of the present invention will be described as below in detail with reference to the accompanying drawings. It should be understood that the specific implementations described herein are merely for describing and explaining the present invention and not intended to limit the present invention.

Figure 1:
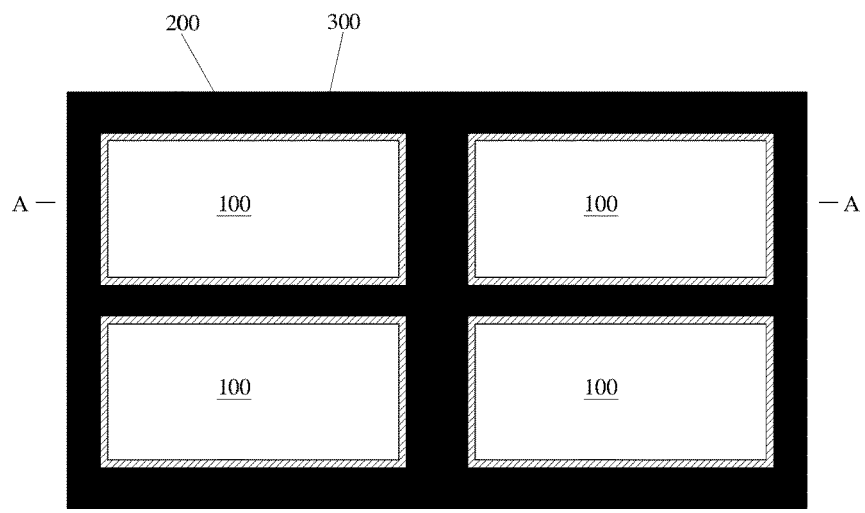
FIG. 1 is a top view of an optical mask plate provided by the present invention.
Figure 2:
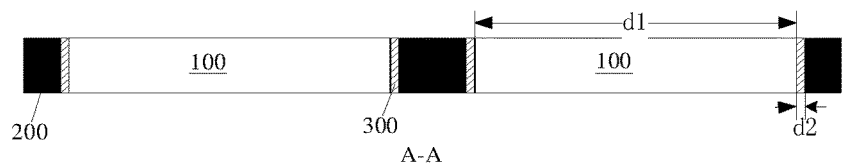
FIG. 2 is a sectional view of the optical mask plate shown in FIG. 1 along line A-A.

As shown in FIG. 1 and FIG. 2, one aspect of the present invention provides an optical mask plate, including at least one totally-transmissive region 100 and a blocking region 200 surrounding the totally-transmissive region 100. The totally-transmissive region 100 allows lasers having a predetermined wavelength to completely pass therethrough, while the blocking region 200 does not allow the lasers having the predetermined wavelength to pass therethrough.

Figure 4A:
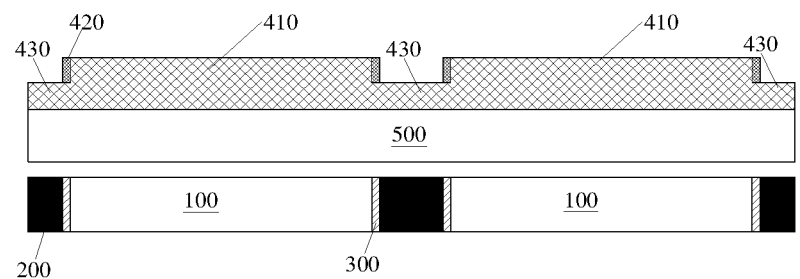
FIG. 4($a$) is a schematic diagram illustrating a manner in which the optical mask plate provided by the present invention works with a flexible member adhered onto a rigid substrate.
Figure 4B:
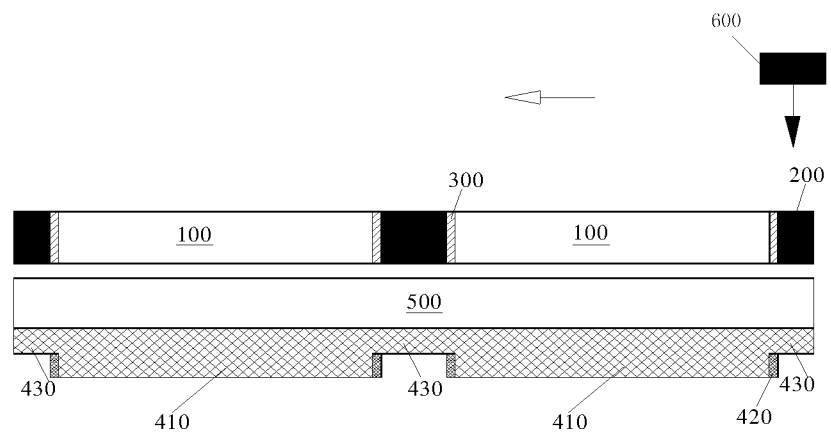
Figure 4C:
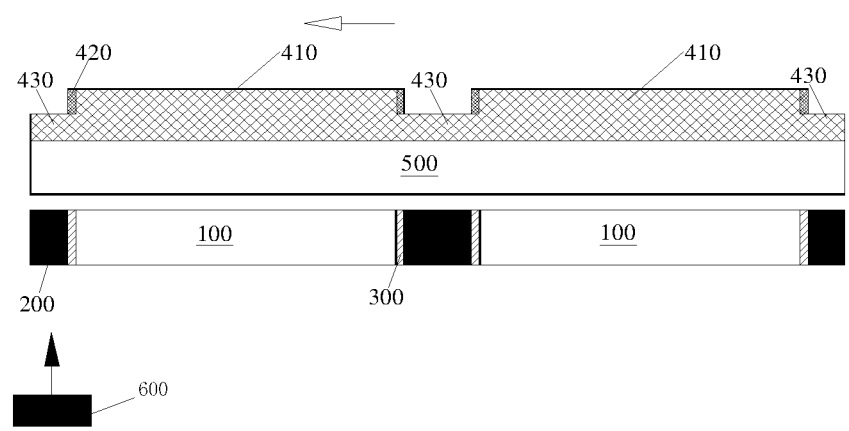

As shown in FIG. 4($a$) to FIG. 4($c$), when a flexible member (the flexible member includes at least one flexible device 410 and a cutoff region 430 surrounding the flexible device 410) adhered onto a rigid substrate 500 (the rigid substrate in the present invention is usually made of a transparent material such as glass, quartz or the like) is lifted off by the above optical mask plate, the optical mask plate is aligned with the flexible member. Specifically, the totally-transmissive region 100 of the optical mask plate is aligned with the flexible device 410, and the cutoff region 430 is accordingly aligned with the blocking region 200 of the optical mask plate. A laser beam composed of lasers having a predetermined wavelength is emitted towards the optical mask plate (as shown by solid arrows in FIG. 4($b$) and FIG. 4($c$)), and the laser beam is moved from one side of the rigid substrate 500 to the other side of the rigid substrate, that is, the rigid substrate 500 is scanned with the laser beam. During the scanning, the laser beam reaching the blocking region 200 is blocked by the blocking region 200, and therefore the cutoff region 430 corresponding to the blocking region 200 will not be separated from the rigid substrate 500. The laser beam reaching the totally-transmissive region 100 completely passes through the totally-transmissive region 100, and thus the flexible device 410 corresponding to the totally-transmissive region 100 is completely separated from the rigid substrate 500. After the flexible device 410 is completely separated from the rigid substrate 500, the flexible device 410 may be separated from the cutoff region 430 by mechanical means (for example, cutting). Finally, the cutoff region 430 is still adhered onto the rigid substrate 500, while the flexible device 410 is separated from the rigid substrate 500.

During the whole process of scanning the rigid substrate 500 with the laser beam, as a laser emitter for emitting the laser beam can be in an on state all the time, the energy of the laser beam is nearly uniform in the process of scanning the rigid substrate 500 with the laser beam, and in this way, edge portions of the flexible device 410 can be prevented from being burned by the laser beam.

Those skilled in the art should understand that the flexible device 410 may be a flexible display panel.

To improve production efficiency, generally, a plurality of flexible devices 410 may be included on one flexible member. Correspondingly, as shown in FIG. 1 and FIG. 2, the optical mask plate may include a plurality of totally-transmissive regions 100, and each totally-transmissive region 100 is surrounded by the blocking region 200. In the implementation as shown in FIG. 1, there are four totally-transmissive regions 100 arranged on the optical mask plate. However, the number of the totally-transmissive regions 100 is not limited thereto, as long as the number of the totally-transmissive regions 100 is consistent with the number of the flexible devices 410 on the corresponding flexible member.

In the present invention, the material of the optical mask plate is not specifically limited, as long as the totally-transmissive region can allow lasers having the predetermined wavelength to completely pass therethrough and the blocking region can block the lasers having the predetermined wavelength. Here, the "lasers having the predetermined wavelength" indicates that the energy of the lasers having this wavelength is sufficient to separate the flexible member from the rigid substrate.

As an implementation of the present invention, the blocking region 200 may be made of metal material (for example, a steel plate or a copper plate), and the totally-transmissive region 100 may be a first through hole. Specifically, the first through hole may be formed in a metal plate, and the first through hole is the totally-transmissive region 100, while the portion surrounding the first through hole is the blocking region 200. Of course, the blocking region 200 may also be made of metal material only, and the region surrounded by the blocking region 200 is the totally-transmissive region 100. Alternatively, as another implementation of the present invention, the totally-transmissive region 100 may be made of light transmitting material (for example, a material having high transmittance for lasers, such as quartz material, glass or the like), and the blocking region 200 is made of metal material.

As a preferred implementation of the present invention, as shown in FIG. 1 and FIG. 2, the optical mask plate may further include at least one transition region 300, each of which is located between the totally-transmissive region 100 and the blocking region 200. The transition region 300 surrounds the totally-transmissive region 100 and allows a part of the lasers having the predetermined wavelength to pass therethrough.

Further, a flexible device edge 420 surrounding the flexible device 410 may be provided on the flexible member, and the transition region 300 on the optical mask plate are arranged in correspondence with the flexible device edge 420. As a part of lasers of the laser beam can pass through the transition region 300, the connection strength between the flexible device edge 420 and the rigid substrate 500 is reduced after being scanned by the laser. After being scanned by the laser, the flexible device 410 has not been separated from the flexible member yet, and the flexible device 410 may be subjected to some subsequent processing. For example, the flexible device edge 420 is separated from the cutoff region 430 by mechanical cutting or other means, so that the flexible device 410 is separated from the rigid substrate 500.

Preferably, the width d2 of the transition region 300 may be one twentieth to one tenth of the width d1 of the totally-transmissive region 100.

Figure 3A:
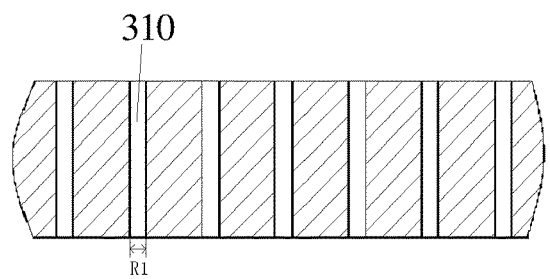
FIG. 3($a$) and FIG. 3($b$) are schematic diagrams of a part of a transition region.
Figure 3B:
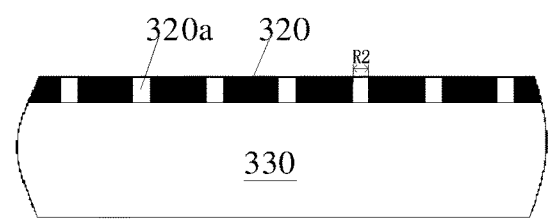

In the present invention, the material of the transition region 300 is not specifically limited. As an implementation of the present invention, as shown in FIG. 3(*a*), the transition region 300 may be made of metal material, and a plurality of second through holes 310 having a diameter R1 of micrometer scale are formed in the transition region 300. The second through holes 310 may allow lasers to pass therethrough, and portions between the second through holes 310 may prevent lasers from passing therethrough. By controlling the diameter R1 of the second through holes 310 and the number of the second through holes 310, the transmittance of the lasers may be controlled. For example, the diameter R1 of the second through holes 310 may be set between 10 μm and 100 μm.

Preferably, within the transition region 300, the number of the second through holes 310 in a unit area decreases gradually in a direction from an edge adjacent to the totally-transmissive region 100 to an edge adjacent to the blocking region 200. This arrangement may allow the connection strength between the flexible device edge 420 and the rigid substrate 500 to be gradually reduced from outside to inside (i.e., in a direction from an edge adjacent to the cutoff region 430 to an edge adjacent to the flexible device 410), so as to facilitate separation of the flexible device 410 from the rigid substrate 500.

Alternatively, the transition region 300 may be made of material having a predetermined transmittance. The transmittance of lasers may be controlled by controlling the thickness of the transition region 300. The material having the predetermined transmittance allows a part of lasers having the predetermined wavelength to pass therethrough.

Alternatively, as shown in FIG. 3(*b*), each transition region 300 may include a transparent material layer 330 and a blocking layer 320 disposed on the transparent material layer 330. A plurality of third through holes 320*a* having a diameter R2 of micrometer scale are formed in the blocking layer 320. The transparent material layer 330 allows the lasers having the predetermined wavelength to pass therethrough, while portions of the blocking layer 320 without any third through hole 320*a* do not allow the lasers having the predetermined wavelength to pass therethrough. For example, the diameter R2 of the third through holes 320*a* may be set between 10 μm and 100 μm to allow a part of the lasers having the predetermined wavelength to pass through the third through holes 320*a*. The blocking layer 320 may be made of metal material.

Similar to the second through holes 310, within the transition region 300, the number of the third through holes 320*a* in a unit area decreases gradually in a direction from an edge adjacent to the totally-transmissive region 100 to an edge adjacent to the blocking region 200.

As another aspect of the present invention, as shown in FIG. 4(*b*) and FIG. 4(*c*), there is provided a laser lift-off device, including an optical mask plate and a laser emitter 600 capable of emitting a laser beam composed of lasers having a predetermined wavelength towards the optical mask plate (as shown by solid arrows in FIG. 4(*b*) and FIG. 4(*c*)), wherein the optical mask plate is the above optical mask plate provided by the present invention, and the laser emitter 600 may emit the laser beam towards the optical mask plate from one side of the optical mask plate.

As described above, when a flexible member (the flexible member includes at least one flexible device 410 and a cutoff region 430 surrounding the flexible device 410) adhered onto a rigid substrate 500 is lifted off by the above laser lift-off device, the optical mask plate is aligned with the flexible member. Specifically, the totally-transmissive region 100 of the optical mask plate is aligned with the flexible device 410, and the cutoff region 430 is correspondingly aligned with the blocking region 200 of the optical mask plate. The laser beam composed of lasers having the predetermined wavelength is emitted towards the optical mask plate (as shown by solid arrows in FIG. 4(*b*) and FIG. 4(*c*)), and the laser beam is moved from one side of the rigid substrate 500 to the other side of the rigid substrate, that is, the rigid substrate 500 is scanned with the laser beam. During the scanning, the laser beam reaching the blocking region 200 is blocked by the blocking region 200, so the cutoff region 430 corresponding to the blocking region 200 will not be separated from the rigid substrate 500. The laser beam reaching the totally-transmissive region 100 completely passes through the totally-transmissive region 100, and thus the flexible device 410 corresponding to the totally-transmissive region 100 is completely separated from the rigid substrate 500. After the flexible device 410 is completely separated from the rigid substrate 500, the flexible device 410 may be separated from the cutoff region 430 by mechanical means (for example, cutting). Finally, the cutoff region 430 is still located on the rigid substrate 500, while the flexible device 410 is separated from the rigid substrate 500.

In the present invention, as shown in FIG. 4(*b*), the laser emitter may be configured to move from one side of the rigid substrate 500 to the other side of the rigid substrate 500. The moving direction of the laser emitter is shown by a hollow arrow in FIG. 4(*b*).

Alternatively, as shown in FIG. 4(*c*), the laser emitter is fixed, while the rigid substrate 500 is configured to move relatively to the laser emitter (the moving direction of the rigid substrate 500 is shown by the hollow arrow). As a result, the laser beam may be allowed to scan from one side of the rigid substrate 500 to the other side of the rigid substrate 500.

When the laser lift-off device provided by the present invention is used, the optical mask plate is located between the laser emitter and a surface of the rigid substrate 500 without a flexible member arranged thereon. As shown in FIG. 4(*b*), the optical mask plate may be disposed above the rigid substrate; or, as shown in FIG. 4(*c*), the optical mask plate may be disposed under the rigid substrate.

It should be understood that the foregoing implementations are merely exemplary implementations used for explaining the principle of the present invention, but the present invention is not limited thereto. Those of ordinary skill in the art may make various variations and improvements without departing from the spirit and essence of the present invention, and these variations and improvements shall fall into the protection scope of the present invention.

The invention claimed is:

1. An optical mask plate for a laser lift-off device, comprising at least one totally-transmissive region and a blocking region surrounding the totally-transmissive region, wherein the totally-transmissive region allows a laser beam having a predetermined wavelength to completely pass therethrough, while the blocking region does not allow the laser beam having the predetermined wavelength to pass therethrough, wherein the optical mask plate further comprises at least one transition region, each of which is located between the totally-transmissive region and the blocking region and allows a part of the laser beam having the predetermined wavelength to pass therethrough, each of the at least one totally-transmissive region is surrounded by one of the at least one transition region, a plurality of second through holes, each having a diameter between 10 and 100 micrometers, are formed in each transition region, and within each transition region, the number of the second through holes in a unit area decreases gradually in a direction from an edge adjacent to the totally-transmissive region to an edge adjacent to the blocking region.

2. The optical mask plate according to claim 1, wherein the optical mask plate comprises a plurality of totally-transmissive regions, and each totally-transmissive region is surrounded by the blocking region.

3. The optical mask plate according to claim 1, wherein the blocking region is made of metal material, and each totally-transmissive region is a first through hole.

4. The optical mask plate according to claim 1, wherein the blocking region is made of metal material, and each totally-transmissive region is made of light transmitting material.

5. The optical mask plate according to claim 4, wherein each totally-transmissive region is made of quartz material or glass.

6. The optical mask plate according to claim 1, wherein, in a direction in which the totally-transmissive region has a longer length, a width of the transition region is one twentieth to one tenth of a width of the totally-transmissive region.

7. The optical mask plate according to claim 1, wherein each transition region is made of metal material.

8. The optical mask plate according to claim 6, wherein each transition region is made of metal material.

9. The optical mask plate according to claim 1, wherein each transition region is made of material having a predetermined transmittance so that the transition region allows a part of the laser beam having the predetermined wavelength to pass therethrough.

10. The optical mask plate according to claim 6, wherein each transition region is made of material having a predetermined transmittance so that the transition region allows a part of the laser beam having the predetermined wavelength to pass therethrough.

11. The optical mask plate according to claim 1, wherein each transition region comprises a transparent material layer and a blocking layer disposed on the transparent material layer, a plurality of third through holes, each having a diameter between 10 and 100 micrometers, are formed in the blocking layer, the transparent material layer allows the laser beam having the predetermined wavelength to pass therethrough, and portions of the blocking layer without any third through hole formed therein do not allow the laser beam having the predetermined wavelength to pass therethrough.

12. The optical mask plate according to claim 6, wherein each transition region comprises a transparent material layer and a blocking layer disposed on the transparent material layer, a plurality of third through holes, each having a diameter between 10 and 100 micrometers, are formed in the blocking layer, the transparent material layer allows the laser beam having the predetermined wavelength to pass therethrough, and portions of the blocking layer without any third through hole formed therein do not allow the laser beam having the predetermined wavelength to pass therethrough.

13. The optical mask plate according to claim 11, wherein, within each transition region, the number of the third through holes in a unit area decreases gradually in a direction from an edge adjacent to the totally-transmissive region to an edge adjacent to the blocking region.

14. A laser lift-off device, comprising an optical mask plate and a laser emitter capable of emitting a laser beam having a predetermined wavelength, wherein the optical mask plate is the optical mask plate according to claim 1, and the laser emitter is capable of emitting the laser beam towards the optical mask plate from one side of the optical mask plate.

15. A method for lifting off a flexible member from a rigid substrate by using an optical mask plate, the optical mask plate comprising at least one totally-transmissive region and a blocking region surrounding the totally-transmissive region, wherein the totally-transmissive region allows a laser beam having a predetermined wavelength to completely pass therethrough, while the blocking region does not allow the laser beam having the predetermined wavelength to pass therethrough, wherein the optical mask plate further comprises at least one transition region, each of which is located between the totally-transmissive region and the blocking region and allows a part of the laser beam having the predetermined wavelength to pass therethrough, and each of the at least one totally-transmissive region is surrounded by one of the at least one transition region, a plurality of second through holes, each having a diameter between 10 and 100 micrometers, are formed in each transition region, and within each transition region, the number of the second through holes in a unit area decreases gradually in a direction from an edge adjacent to the totally-transmissive region to an edge adjacent to the blocking region;

the flexible member comprising at least one flexible device and a cutoff region surrounding the flexible device; and the method comprising:

aligning the optical mask plate with the flexible member such that the totally-transmissive region of the optical mask plate is aligned with the flexible device, and the cutoff region is correspondingly aligned with the blocking region of the optical mask plate; and scanning the rigid substrate with the laser beam.

16. The method for lifting off a flexible member from a rigid substrate by using an optical mask plate according to claim 15, wherein scanning the rigid substrate with the laser beam comprises: moving the laser beam from one side of the rigid substrate to the other side of the rigid substrate.

17. The method for lifting off a flexible member from a rigid member by using an optical mask plate according to claim 15, wherein scanning the rigid substrate with the laser beam comprises: keeping the laser beam at a fixed position, while moving the rigid substrate relatively to the laser beam.

18. The method for lifting off a flexible member from a rigid member by using an optical mask plate according to claim 15, wherein the optical mask plate is located between the laser beam and a surface of the rigid substrate without the flexible member arranged thereon.

* * * * *